W. F. Wickersham.
Excavator.

N°. 32,660.  Patented Jan. 26, 1861.

Witnesses:
Jus Hellany

Inventor:
W. F. Wickersham
By his Atty
Amos Broadway

UNITED STATES PATENT OFFICE.

W. F. WICKERSHAM, OF SPRINGFIELD, ILLINOIS.

EXCAVATING-MACHINE.

Specification of Letters Patent No. 32,660, dated June 25, 1861.

To all whom it may concern:

Be it known that I, W. F. WICKERSHAM, of Springfield, in the county of Sangamon and State of Illinois, have invented a new and useful Dirt-Elevator; and I do hereby declare that the following is a full, clear, and exact description of the same, reference being had to the annexed drawing, making part of this specification, in which—

Figure 3:
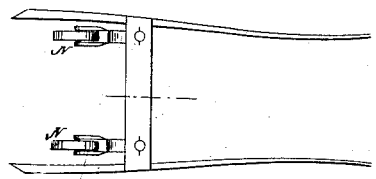
Figure 4:
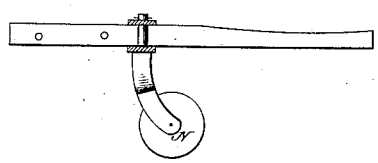
Figure 1:
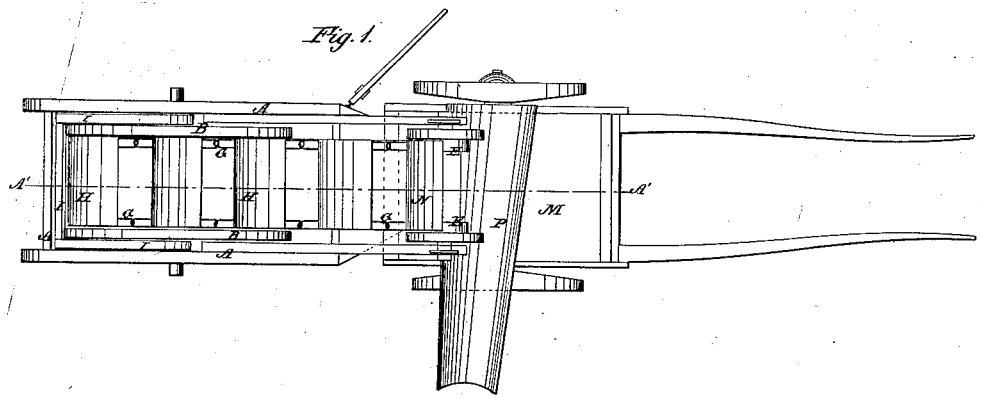
Figure 2:
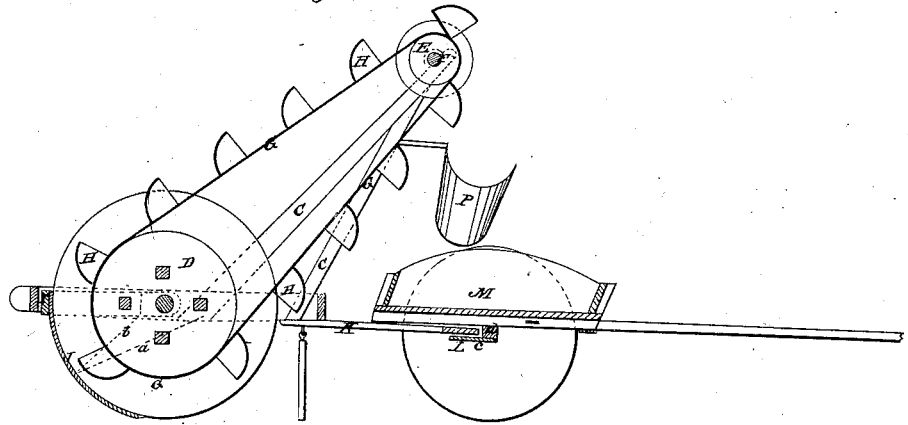

Figure 1 is a top view of my said machine; Fig. 2 a longitudinal section through the same on the line A′ A′ and Figs. 3 and 4 are parts of the machine to be hereinafter described.

My invention consists, first, in the novel construction of a dirt "excavating elevator," and second, in combining the same with a common dumping cart in such a manner that the forward motion of the said cart will carry the elevator with it, and cause it to fill the cart with dirt, and so that the cart may be readily detached from the elevator, that it may be moved and dumped in any given position.

The following description of my invention will enable anyone skilled in the art to which it appertains to make and use the same.

Similar letters of reference represent corresponding parts of the different figures in the drawing annexed.

The main frame of my machine is represented in the drawing by A A. This frame is mounted upon a pair of truck-wheels (B B) rigidly attached to a revolving shaft upon which the frame is supported; outside of the said wheels—in the manner shown in the drawing.

Upon the main frame aforesaid, there is a second frame erected, shown by C, at an angle, so as to overhang the front part of the main frame, in the manner shown.

To the inside of the truck-wheels, aforementioned, there the two chain wheels (D,D,) bolted, one to the inside of each wheel, and in the upper part of the frame C there are two plain wheels or drums (E, E) fixed upon a shaft (F,) which is located in suitable bearings in the upper part of the said frame. Over each of the chain wheels aforesaid and the drums E, there is an endless chain passed, shown by G G, which endless chains are united to one another by means of buckets (H H &c.) made to travel about the chain wheels and drums aforesaid, when the truck wheels are in motion.

In the inside of the main frame and on the shaft of the truck wheels, is hung a scraper frame I, to which a scraper J is fixed, the lower edge of which extends downward to very near the lower part of the truck wheels. This scraper is sustained and braced by means of braces $a$ and $b$, shown in the drawing by red lines, the brace $a$ being attached to the main frame, and the brace $b$ to the scraper frame. The edge of the said scraper must be set as near the edge of the buckets as it can be without striking them, so that the buckets will clean the dirt out of the scraper as fast as the scraper takes it up.

To the front end of the main frame a pair of "hounds," K, are fixed, the out ends of which unite in a sharp angle, or apex, wherein a pin $c$, is fixed, which hooks in a hole made for that purpose in the plate L, attached to the under side of the shaft $d$ of the cart M, which is of the ordinary dumping variety, and needs therefore no special description here.

In using this machine the ground must first be plowed. The machine is then hooked to the cart, as before stated, and as it moves forward the dirt is gathered in the scraper, from whence it is removed by the buckets, or elevators, and deposited in the cart.

When the machine is used to cut a ditch with the "hounds" K are removed and the shafts shown in Figs. 3 and 4 are applied in place of the cart, and the team is driven tandem, so as to enable it to walk in the ditch.

The shafts and the front part of the machine are supported by the caster wheels N, and the dirt is delivered on the side of the ditch by means of the leader P, which is fixed to the upper part of the frame C, and in the front thereof in the manner shown.

Having thus described the construction and operation of my invention, what I claim as new and desire to secure by Letters Patent, is—

The arrangement and combination of the frame C the elevators H the leader P, the scraper J and the cart M the whole to be constructed jointly, substantially in the manner described for the purpose specified.

W. F. WICKERSHAM.

Witnesses:
C. E. GRAY,
JOHN K. HALE.